United States Patent
Austin et al.

(10) Patent No.: US 6,799,059 B1
(45) Date of Patent: Sep. 28, 2004

(54) SYSTEM AND METHOD FOR IMPROVING DOWNLINK SIGNAL QUALITY IN MOBILE TELEPHONE COMMUNICATIONS SYSTEMS

(75) Inventors: Mark D. Austin, Atlanta, GA (US); Michael L. Heubel, Marietta, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

(21) Appl. No.: 09/468,931

(22) Filed: Dec. 22, 1999

(51) Int. Cl.[7] .............................................. H04B 1/38
(52) U.S. Cl. ....................... 455/561; 455/507; 455/452; 370/337; 370/343
(58) Field of Search ................................ 455/561, 504, 455/403, 103, 219, 220, 232.1, 245.1, 194.1, 452, 507, 132, 562; 370/347, 341, 342–343, 486, 337, 338, 344, 321, 277, 281, 276, 278

(56) References Cited

U.S. PATENT DOCUMENTS

| | | | | |
|---|---|---|---|---|
| 5,751,250 A | * | 5/1998 | Arntz | 342/373 |
| 5,752,170 A | * | 5/1998 | Clifford | 455/126 |
| 5,933,766 A | * | 8/1999 | Dent | 455/103 |
| 6,006,111 A | * | 12/1999 | Rowland | 455/561 |
| 6,091,715 A | * | 7/2000 | Vucetic et al. | 370/277 |
| 6,104,935 A | * | 8/2000 | Smith et al. | 455/562 |
| 6,205,133 B1 | * | 3/2001 | Bexten | 370/343 |
| 6,219,562 B1 | * | 4/2001 | Williams | 455/561 |
| 6,243,038 B1 | * | 6/2001 | Butler et al. | 342/373 |

OTHER PUBLICATIONS

Lee, William C.Y., "Mobile Communications Engineering Theory and Applications," McGraw–Hill (1998), chapters 13–14 (pp. 449–491 & 493–509),and pp. 586–587.

Olofsson, H. et al. "Transmitter Diversity with Antenna Hopping for Wireless Communication Systems," 1997 IEEE 4th Vehicular Technology Conference, vol. 3, pp. 1743–1747.

Stuber, Gordon L., "Principles of Mobile Communication," Kluwer Academic (1996), pp. 589–642.

* cited by examiner

Primary Examiner—Pablo N. Tran
(74) Attorney, Agent, or Firm—Shaw Pittman LLP (57) ABSTRACT

The effects of fading on communication using a mobile telephone is reduced by switching between two or more antennas which are used to provide communication between a base station and a mobile telephone in response to a synchronization signal without arcing. The synchronization signal is generated in accordance with a signal quality measured by the mobile telephone. The synchronization signal is either transmitted back to the base station, whereupon the base station determines whether or not to switch based on the transmitted downlink signal quality, or used by the mobile phone to generate an antenna switching instruction that is transmitted back to the base station, whereupon the base station switches between the antennas in accordance with the instruction. Alternatively, the synchronization signal is generated by the base station without feedback from the mobile telephone.

15 Claims, 7 Drawing Sheets

SYSTEM AND METHOD FOR IMPROVING DOWNLINK SIGNAL QUALITY IN MOBILE TELEPHONE COMMUNICATIONS SYSTEMS

BACKGROUND

1. Field of Invention

The present invention relates generally to the field of mobile telephone communication systems. More specifically, the present invention relates to improving downlink signal quality in the presence of signal fading.

2. Background of the Invention

Figure 1:
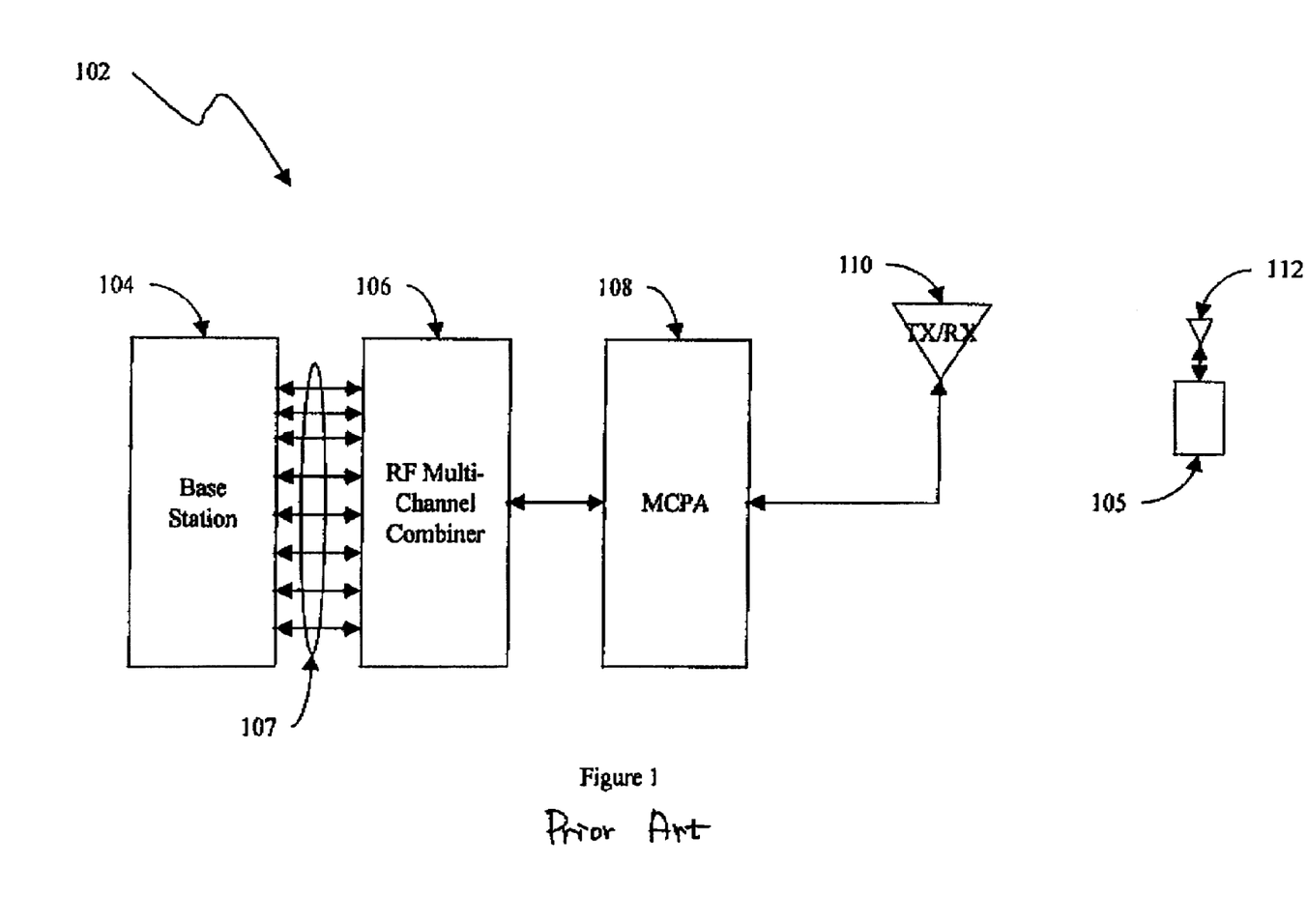
FIG. 1 is a schematic diagram illustrating a conventional mobile telephone system.

FIG. 1 is a schematic diagram illustrating a conventional mobile telephone system 102. As used throughout this specification, the term "mobile telephone systems" includes cellular telephone systems, and the term "mobile telephones" includes cellular telephones. A base station 104 controls communication with one or more mobile telephones, for example, mobile telephone 105. Base station 104 transmits information over multiple radio frequency (RF) signals 107 using radios (not shown). The multiple RF signals are combined into a single RF signal for transmission to the one or more mobile telephones. Prior to transmission, a multi-channel power amplifier (MCPA) 108 amplifies the combined RF signal for transmission to the one or more mobile telephones. The signal is transmitted through a receiver/transmitter 110 to a receiver/transmitter on the mobile telephones, for example, receiver/transmitter 112 on mobile telephone 105.

An inherent problem with mobile telephone communication systems is the presence of fading in the communication channel between the cell site and the mobile telephone. Because there is only one antenna, any fading of the channel, affects data quality. For example, fading can cause bit errors in digital communication systems which seriously degrade the quality of the transmitted signals such as digitally-encoded voice signals.

One method to avoid the effects of such fading is to decorrelate the effects of the fading on the transmitted bit stream. A conventional decorrelation technique is to divide the communication data for a particular user into multiple slots as done, for example, in system using time division multiple access (TDMA) transmission. According to one well-known TDMA system, TIA/EIA 136, there are six slots available to transmit the digital data corresponding to the voice traffic on the channel. Decorrelation of the fading channel is accomplished by interleaving the communication among the available slots. Interleaving is the process of sending the digital data for each user in multiple time slots. For example, the digital data corresponding to the voice traffic for a user might be sent in time slots 1 and 4. By distributing the digital voice data in this fashion, it is hoped that a fade that occurs in one time slot will not occur in the other time slot.

At slow speeds, however, the fades are long in duration relative to the time of a slot. In a single antenna system, therefore, a single fade is likely to affect both time slots that are dedicated to the user. Thus, a more robust decorrelation scheme is required for low speed data transmission.

Figure 2:
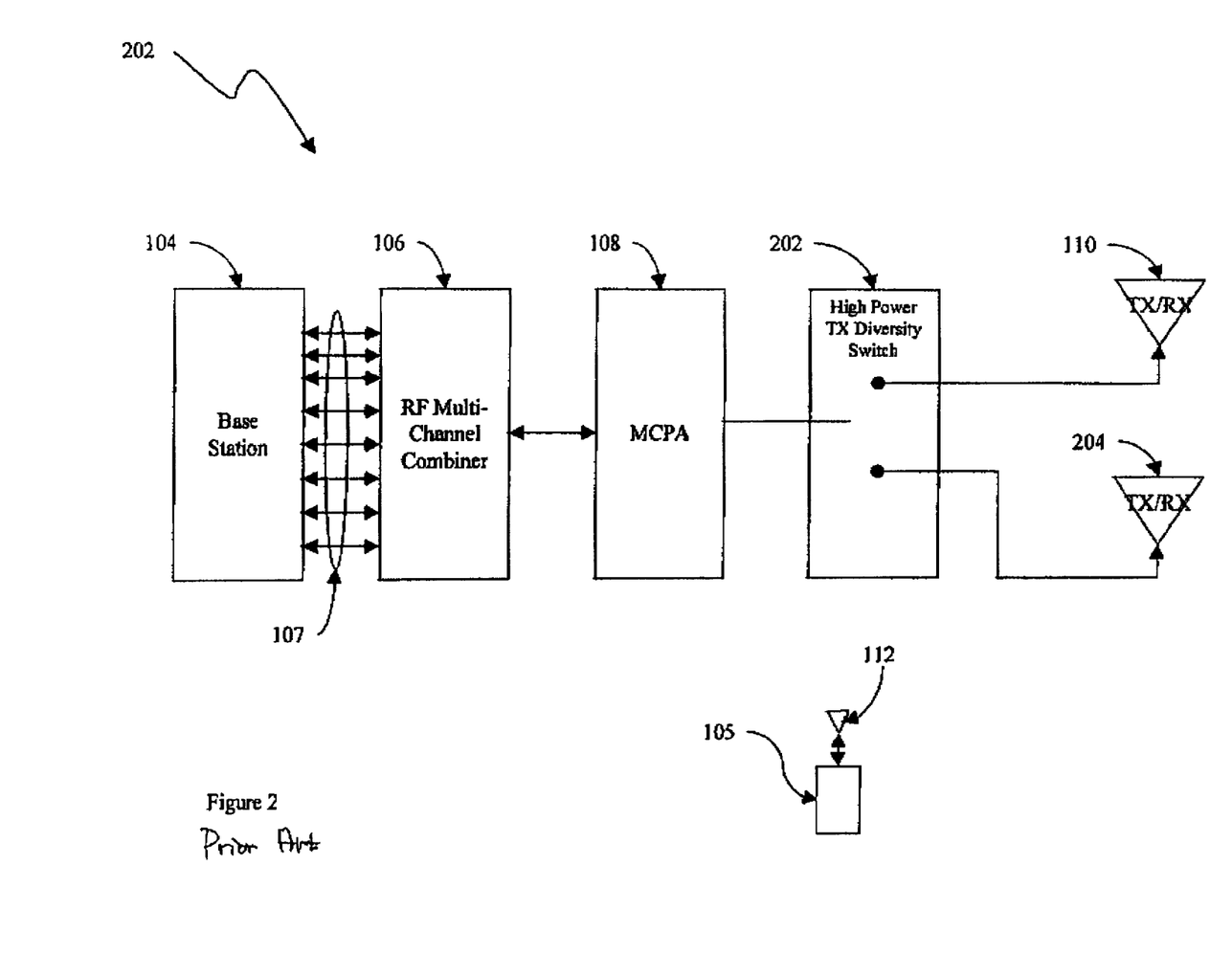
FIG. 2 is a schematic diagram illustrating a conventional system for communicating using frequency hopping.

One such scheme is known as antenna hopping. Antenna hopping uses the property that transmission across different antennas, spaced far enough apart, have uncorrelated fading statistics. Antenna hopping requires two antennas. Such a system is illustrated in FIG. 2. Referring to FIG. 2, a second antenna 204 is added to system 102 for communicating with the one or more mobile telephones. In addition, a switch 202 is added to system 102 to switch between antenna 110 and antenna 204. In conventional antenna hopping systems, data for a particular user for time slot 1 is transmitted out of antenna 104 while the data for that user for time slot 4 is transmitted out of antenna 204. Thus, any fading of the transmitted signal is uncorrelated. That is, the odds that both time slots are experiencing a fade are practically zero because the antennas are spaced sufficiently far apart to reduce the likelihood that fading affects both antennas to near zero. One such antenna hopping system is described in Olofsson, H., et al., "Transmitter Diversity with Antenna Hopping for Wireless Communication Systems," 1997 IEEE $4^{th}$ Vehicular Technology Conference, vol. 3 at 1743-7, which is incorporated by reference herein in its entirety.

One problem with conventional antenna hopping systems is that there is a possibility that one or the other of the antennas is experiencing a fade. In that case, no switching should take place. That is, there is no intelligence to control when the antennas should be switched to improve communication.

A more significant problem with conventional antenna hopping-systems is that the power out of MCPA 108 is sufficiently high that arcing occurs when switch 202 switches between antenna 110 and antenna 204. This arcing manifests itself as RF spikes which can damage system components and cause failures. Conventional systems can only switch about 10 watts without arcing. However, systems to support mobile communications have to be able to switch in excess of 2000 watts.

SUMMARY OF THE INVENTION

The present invention solves the forgoing problems in the art by intelligently switching between antennas when the mobile telephone determines that downlink signal quality has sufficiently degraded. To make this assessment, the mobile telephone makes a measurement of downlink signal quality. In one preferred embodiment the mobile telephone compares this measured signal quality to a predetermined threshold. If the value of the measured downlink signal quality is below the predetermined threshold, the mobile telephone sends an instruction to the base station to switch between antennas. In an alternative embodiment of the present invention, the mobile telephone transmits the measurement itself to the base station. The base station compares the measured downlink signal quality to the predetermined threshold. If the value of the measured downlink signal quality is below the predetermined threshold, the base station switches between antennas. That is, the base station generates the instruction to switch between the antennas based on the measured downlink signal quality that it receives. Alternatively, the base station generates the instruction to switch between the antennas without feedback from the mobile telephone. The instruction that is generated by the base station or the mobile telephone is alternatively referred to herein as a switching instruction.

In a preferred embodiment of the present invention, more than two antennas are available for the base station to use to communicate with a mobile telephone. In this embodiment, the antennas can be switched in a predetermined sequence or a specific antenna can be identified for use.

The switching is preferably controlled by a synchronization signal. The synchronization signal controls the timing of the switches so as to avoid the arcing that would otherwise occur in conventional antenna hopping systems. In a preferred embodiment of the present invention, a continuous low-power signal is applied to an amplifier to prevent repeated cutting off and turning on of the amplifier, thereby preserving its useful life. The synchronization signal can be generated by the base station with or without feedback from the mobile telephone, or as an instruction from the mobile telephone.

Thus, one object of the present invention is to improve communication between a base station and a mobile telephone by reducing the effect of fading on that communication.

Another object of the present invention is to eliminate arcing that occurs in conventional antenna hopping systems.

Another object of the present invention is to synchronize switching between antennas using a synchronization signal.

Another object of the present invention is to allow the use of more than two antennas in an antenna hopping system.

Another object of the present invention is to reduce deterioration of system components, which would otherwise reduce the useful lives of the system components.

These and other objects of the present invention are described in greater detail in the detailed description of the invention, the appended drawings and the attached claims.

DETAILED DESCRIPTION OF THE PREFERRED EMBODIMENTS

Figure 3:
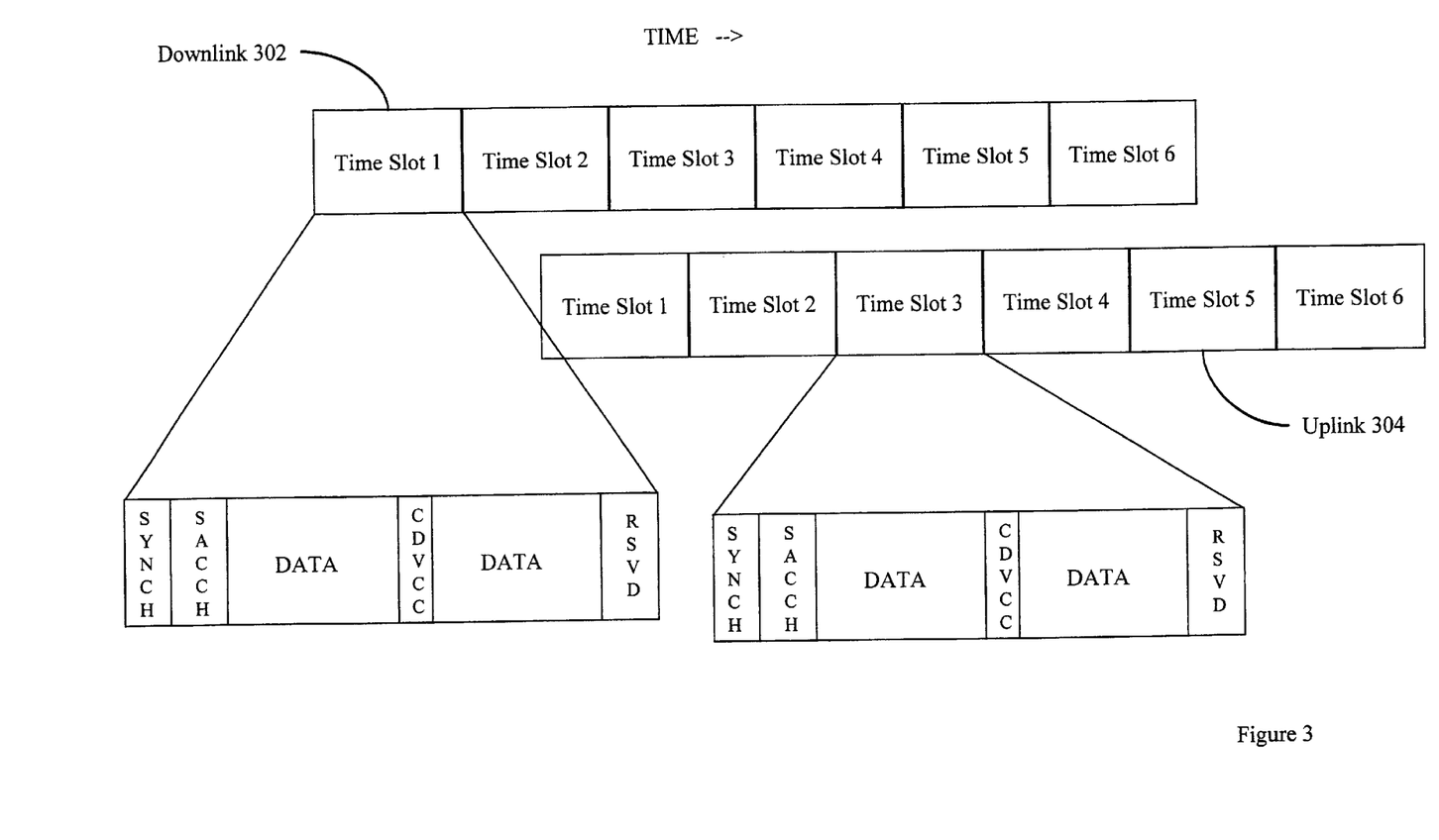
FIG. 3 is a schematic diagram illustrating a downlink and corresponding uplink used by a mobile telephone and base station for communication.

FIG. 3 illustrates an exemplary downlink 302 (from the base station to the mobile) and corresponding uplink 304 (from the mobile to the base station) for TDMA mobile communications. The data transmitted in the downlink is transmitted in time slots. In TDMA according to the IS-136 standard, for example, there are six (6) time slots, labeled Time Slots 1–6 in FIG. 3. Each time slot carries data, synchronization information and overhead data. For example, as shown for time slot 1, each slot contains synchronization bits (SYNCH), in band signaling termed the slow associated control channel (SAACH)), data which is random, site identification information, coded digital verification color code, (CDVCC), and optionally reserved bits (RSVD). This structure is defined in TIA/EIA-136 standard, TIA/EIA-136-A (Oct. 7, 1998), which is hereby incorporated by reference in its entirety herein. Note that the preferred embodiment is a modification of the TIA/EIA-136 slot format to allow placement of the RSVD bits at the end of the frame for reasons described below.

The mobile telephone transmits data on its uplink during the time period between the time slots during which the base station sends it data, for example, between time slots 1 and 4 in the current example. The uplink contains a similar data structure as a time slot in the downlink described above with added messages for call quality management. In the preferred embodiment, the mobile makes an assessment of the signal quality of the signal it receives from the base station. Based on this determination, the mobile telephone sends an instruction to the base station to tell it which antenna to use in the uplink to the base station. In the case of two antennas, this instruction can simply be an instruction to switch transmitting antenna.

In an alternative embodiment, the mobile telephone sends information about the quality of the signal it received from the base station in the uplink antennas. In a preferred embodiment of the present invention, this information need only be one bit to appropriately instruct the base station to switch antennas (described below). Consequently, the information can be sent in any of the reserved bits in the uplink slot format. Using this signal quality estimate, the base station makes a decision (i.e., generates the switching instruction) as to which antenna to use, for example, whether to switch transmitting antenna. Preferably, the information is generated by the mobile telephone. This information can be average signal strength or bit error rate, predictive fading.

Figure 4:
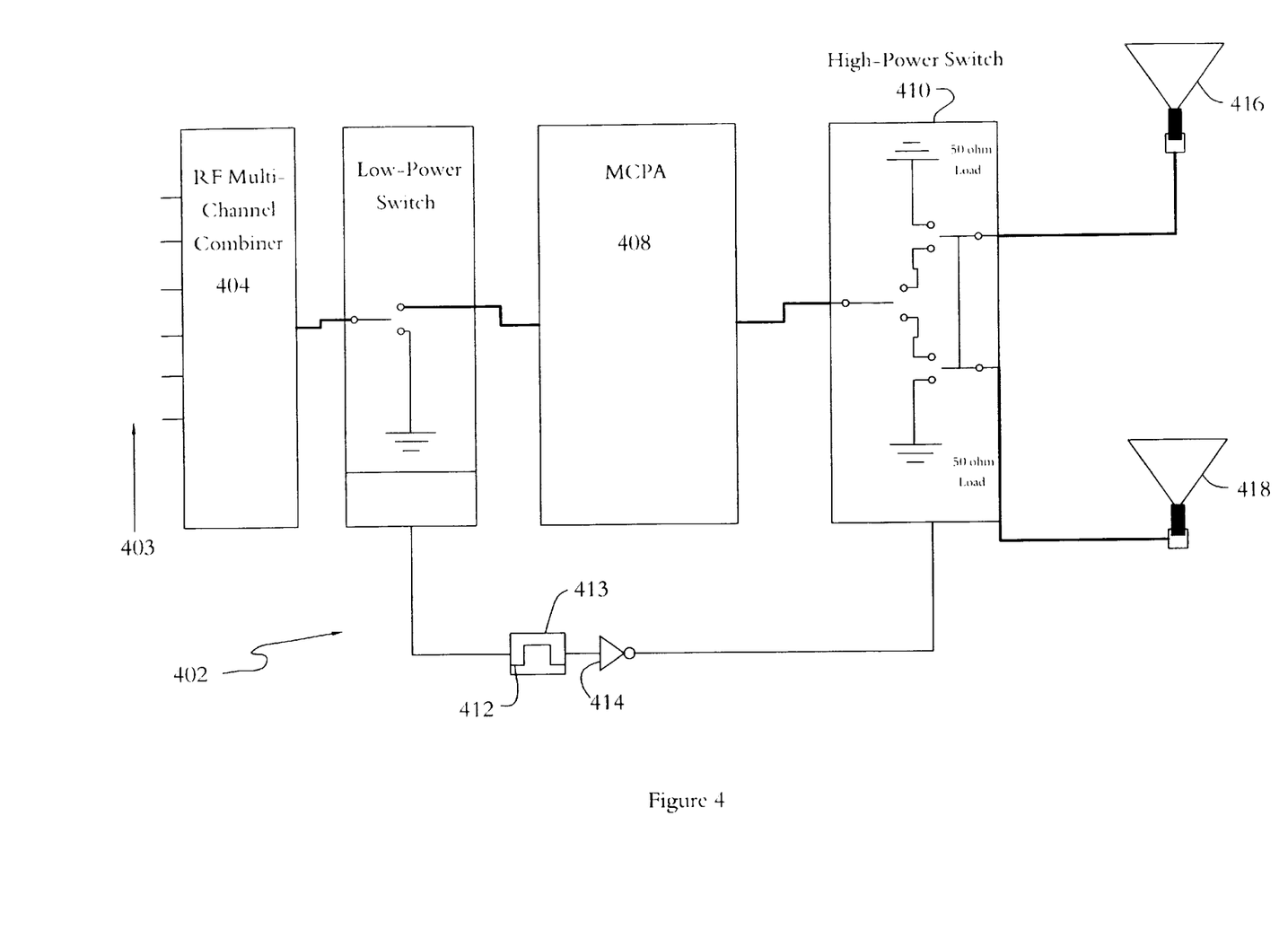
FIG. 4 is a schematic diagram illustrating a system for reducing the effects of fading according to a preferred embodiment of the present invention.

FIG. 4 is a schematic diagram illustrating a system 402 according to a first preferred embodiment of the present invention. The RF carriers 403 from the base station are combined into a single RF for transmission by RF multi-channel combiner 404. The combined input is fed to a low-power switch 406. Low-power switch 406 can switch between its inputs at a high rate without causing arcing and its associated problems. The output of low-power switch 406 is a low power signal which is input to a multi-channel power amplifier (MCPA) 408. The output of MCPA 408 is input to a high-power switch 410. High-power 410 switches to connect its input to either antenna 416 or antenna 418. The input of low-power switch 406 is set to ground when high-power switch 410 performs a switching operation. With the input to low-power switch 406 set to ground, there is no output signal to MCPA 408. Consequently, MCPA 408 produces no output signal. Thus, switching is performed by high-power switch 410 without arcing.

Preferably, switching in both low-power switch 406 and high-power switch 410 is controlled by a synchronization signal, for example, TTL synchronization pulse 412. TTL synchronization pulse is preferably generated by a multivibrator device such as one-shot 413. Synchronization pulse 412 causes a delay between the time that the input to low-power switch 406 is set to ground and when switching occurs in high-power switch 410. In the preferred embodiment, the delay is accomplished by inverting the input of the TTL synchronization pulse to high-power switch 410.

Thus, low-power switch 406 is set to ground. Then high-power switch 410 switches state resulting in a change from antenna 416 to antenna 418 or vice versa. When the input to low-power switch 406 is set to ground, high-power switch 410 performs its switching without arcing. When high-power switch 410 is finished switching, low-power switch 406 switches to reconnect the combined RF input to MCPA 408, thereby completing the switch in antennas.

However, this solution is not optimal for the following reason. When low-power switch 406 is set to the ground and there is no power to MCPA 408, MCPA 408 essentially enters a sleep, or deactivation state. When low-power switch 406 switches to reconnect the RF input to MCPA 408, MCPA 408 takes some time to reactivate to produce an amplified signal at its output. MCPA 408 deactivates because without power applied to its input, its DC power supply cuts off. Turning MCPA 408 back on requires a ramp up time before MCPA 408 can generate an amplified output, that is, reactivate. This constant activation and deactivation of MCPA 408 can shorten its life.

Figure 5:
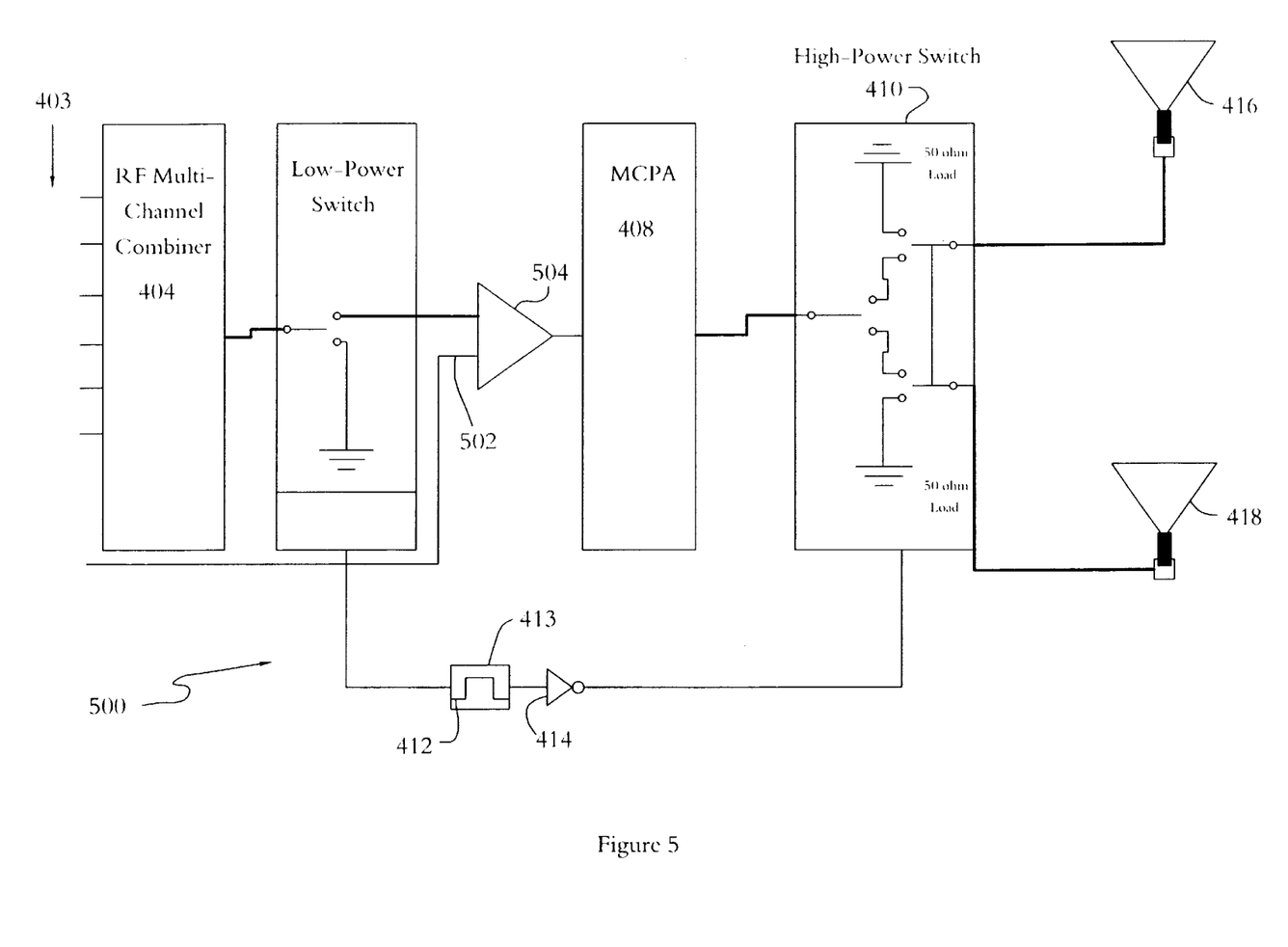
FIG. 5 is a schematic diagram illustrating a system for reducing the effects of fading according to a preferred embodiment of the present invention using a combiner to keep a constant load on the MCPA.

Referring to FIG. 5, a system 500 overcomes this problem by placing a twoway combiner 504 between low-power switch 406 and MCPA 408. One of the inputs to Multi-Channel Combiner 404 is removed and connected to one of the inputs to two-way combiner 504. Preferably, input 502 is the control channel. The control channel is a constant carrier signal that is required to be up between the mobile telephone and the base station to originate and terminate calls. As a single channel, the control channel is a low power signal on the order of one watt. input 502 can be any constant carrier low-power signal. For example, one of the voice channels (if it is constantly on). Additionally, a constant low-power signal generated by a signal generator can be used. However, the use of an additional signal for this purpose is not preferred because it is spectrally inefficient.

A low power signal is one which does not exceed 10 watts at the high power switch. The low-power signal must have a minimum power of 10 dBm to keep MCPA 408 activated. Because of its low power, it will not cause arcing, even when amplified by MCPA 408, when high-power switch 410 switches. MCPA 408 remains active because there is a constant power input to it sufficient to prevent its DC power supply from cutting off.

The control channel meets the above requirements. Thus, the conductor carrying the control channel is disconnected from multi-channel combiner 404 (to which it is conventionally connected), and connected as input 502 to two-way combiner 504. High-power switch 410 switches between antenna 416 and 418 without arcing because there is low power at the output of MCPA 408.

The determination of whether to switch antennas by causing multivibrator 413 to generate synchronization pulse 412 can be made by the mobile telephone or the base station. In the preferred embodiment, the mobile telephone makes the determination and transmits an instruction to the base station to control switching antennas. The mobile telephone makes this determination by measuring the quality of the downlink signal that it receives from the base station. The mobile telephone sends an instruction to the base station to switch antennas when the measured downlink signal quality is below a predetermined threshold. In the case of more than two antennas, the mobile telephones instruction can include the identity of the antenna to which to switch or an instruction to switch to the next antenna in a predetermined switching sequence.

The mobile can make a decision as to the quality of the received data based on any of a number of well-known signal quality measurements. Examples of these measures include link quality signal-to-noise ratio (C/I), BER, predictive fading, estimates made on historical data and received signal strength. Each of these methods of determining channel quality is well-known in the art. For example, channel quality measurements are described in Stuber, Gordon L., PRINCIPLES OF MOBILE COMMUNICATION, Kluwer Academic, 1996, which is incorporated by reference herein in its entirety. Signal strength measurements are described in Lee, William C. Y., MOBILE COMMUNICATIONS ENGINEERING: THEORY AND APPLICATIONS, McGraw-Hill, 1998, which is incorporated by reference herein in its entirety. The TIA/EIA-136 standard describes BER and RSSI measurement reporting in channel quality measurement messages. For example, according to the TDMA standard, each mobile telephone reports bit error rate (BER) information to the base station. The measure of downlink signal quality is compared to a predetermined threshold signal quality. If the measured downlink signal quality is less than the predetermined threshold signal quality, the mobile telephone sends an instruction to the base to cause a switch between antennas as described above.

The mobile telephone can send this instruction in a number of ways. In a preferred embodiment of the present invention, for example, the mobile telephone sends the instruction by flipping one of the reserved bits that it transmits to the base station on the uplink. The reserved bits are described in the TIA/EIA-136 standard referenced above. The reserved bit is used in the preferred embodiment because it is near the end of the slot. This is important because there is a time gap between the end of the slot and when the mobile telephone begins to receive the next transmission. Estimates closer in time to when the mobile telephone receives the next transmission yield better results.

When the base station receives an uplink having the particular reserved bit flipped, it knows to switch the antennas. In an alternate preferred embodiment of the present invention, the value of the particular bit received by the base station is used directly as the synchronization pulse 412, rather than using multivibrator 413 to generate synchronization pulse 412.

One problem with using only one bit to provide the instruction is that it is susceptible to errors in the received bit. Such a bit error will cause antenna switching when it is not necessary, or even when it is undesirable. For this reason, a more robust method for the mobile telephone to instruct the base station to switch antennas is desired. In the preferred embodiment, this is accomplished by using more than one bit, for example, the CDVCC identification code, to transmit the instruction to the base station to cause a switch between antennas. The base station provides the CDVCC identification code to the mobile, for example 123. The mobile stores the CDVCC as shown in FIG. 2 and echoes this value back to the base station. Thus, another way to control antenna switching is to modify the CDVCC value echoed back to the cell site in a known way when the measure downlink signal quality falls below the predetermined threshold value. When the base station receives the modified value it switches the antennas. Although bit errors might occur in the modified value or unmodified value of the CDVCC echoed back to the base station, it is unlikely that the base station will not be able to determine whether a switch between antennas is desired or not. That is, the CDVCC or its modified value will be apparent even in the presence of bit errors. In the preferred embodiment, the modified value of the CDVCC code is generated by flipping each bit in the code. The multiple bit approach is preferable to using a single bit because it is much more robust. To use the CDVCC, the base station must be modified to recognize the meaning of the modified, for example, flipped, value of the CDVCC. Such a modification would be apparent to those skilled in the art.

In an alternate preferred embodiment, the mobile is modified to transmit a control word indicating which antenna should be used. This alternate embodiment, however, requires changes to conventional mobile telephones to transmit this control word, as well as changes in the TDMA standard to provide for it in the control channel. Such an embodiment can be used where there are more than two transmitting antenna from which to choose.

In an alternative preferred embodiment of the present invention, the determination of whether to switch antennas is made by the base station. In this embodiment, the mobile telephone measures the downlink signal quality as described above. The mobile telephone transmits this estimate to the base station in the uplink. Using this estimate of downlink signal quality, the base station makes the determination of whether to switch or not, that is, the base station generates the switching instruction. This determination can be made by comparing the received estimate to a predetermined threshold value. If the received estimate is less than the threshold value, the base station causes multivibrator 413 to generate a synchronization pulse 412, thereby causing switching between antennas 416 and 418.

In an alternative preferred embodiment of the present invention, the base station makes the determination of whether to switch antennas based on the expected values in the signal it receives from the mobile telephone to generate the switching instruction. For example, the base station can check the CDVCC code returned by the mobile telephone. If too many bits are in error, the base causes the antennas to switch. The number of bits that can be in error is set as a predetermined threshold.

In an alternate embodiment, the base station estimates the signal quality of the uplink transmitted by the mobile based on a characteristic of the signal transmitted by the mobile telephone to generate the switching instruction. For example, the base station can estimate the signal strength of the uplink, or its bit error rate. Additionally, the other signal quality estimates described above can be measured and used. Based on this signal quality estimate, the base station determines whether to switch the antenna or not. It is important to note that the frequencies of the uplink and downlink differ by approximately 45 MHz. Consequently, care should be exercised when using a signal quality measure of the uplink to determine whether the antennas should be switched.

Alternatively, the base station makes the determination of whether to switch antennas without feedback from the mobile telephone. For example, in a preferred embodiment of the present invention, the base station causes the antennas to switch in a random fashion. Alternatively, the base station can cause the antennas to switch on a fixed time interval, for example, once a frame. It would be apparent to those skilled in that art that there are numerous ways to have the base station cause the antennas to switch without relying on feedback from the mobile telephone.

Figure 6:
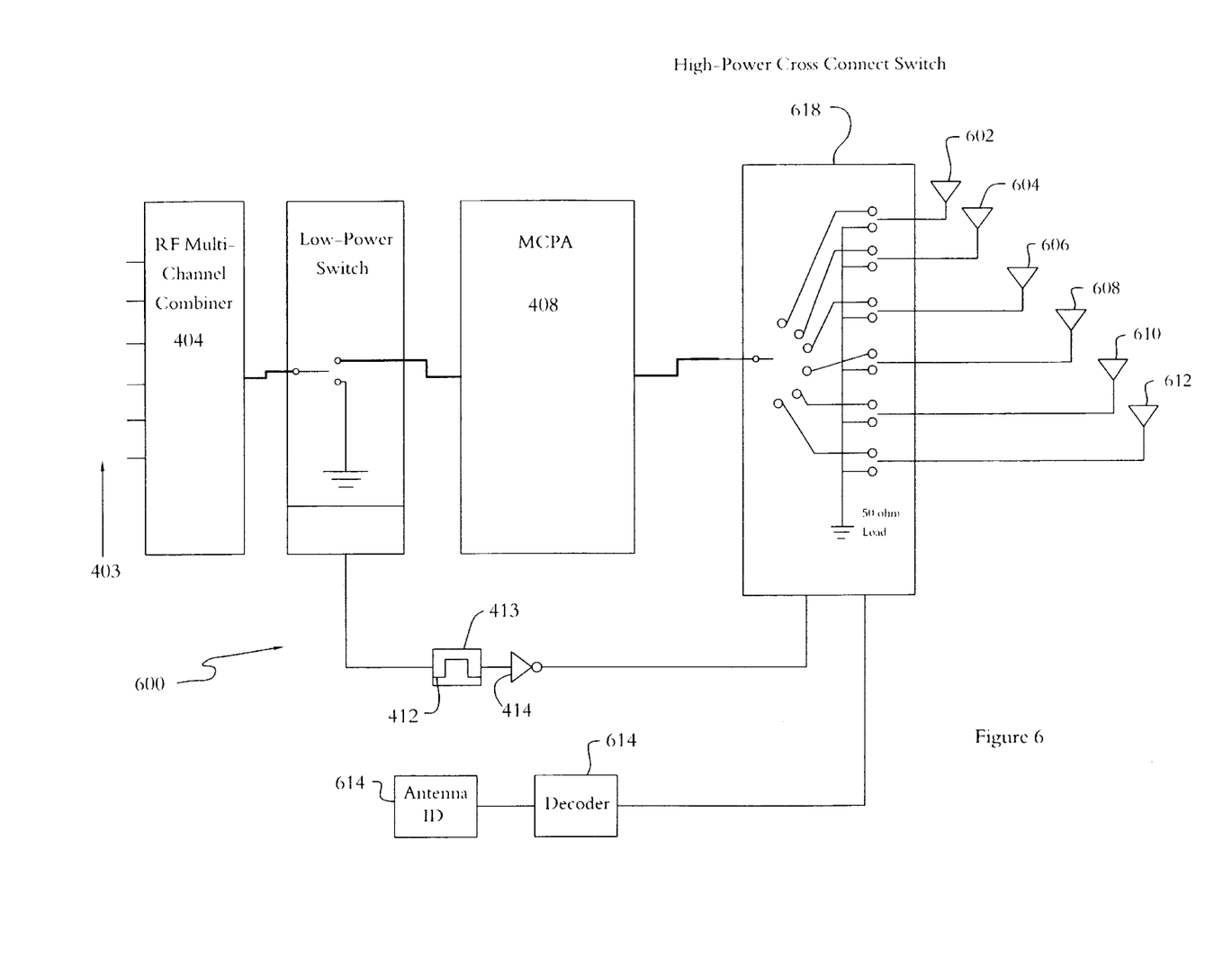
FIG. 6 is a schematic diagram illustrating a system for reducing the effects of fading according to a preferred embodiment of the present invention using more than two antennas.

As mentioned above, the present invention can be used with more than two antennas. FIG. 6 illustrates a system 600 in which multiple antennas 602, 604, 606, 608, 610 and 612 are employed to transmit data to and receive data from mobile telephones. As described above, the mobile telephone determines the identification of the antenna, antenna ID 614, which should be used. Alternatively, the base determines antenna ID 614. As described above, the determination of which antenna should be used can be done a number of ways. For example, the antenna to be used can be the next antenna in a rotation, for example, antenna 606, when antenna 604 was last used. Antenna ID 614 is input to a decoder 616 which causes a high-power cross-connect switch 618 to connect the output of MCPA 408 to the appropriate antenna 602, 604, 606, 608, 610 or 612. It would be apparent to those skilled in the art that more or fewer antennas can be used within the scope and-spirit of the present invention.

Figure 7:
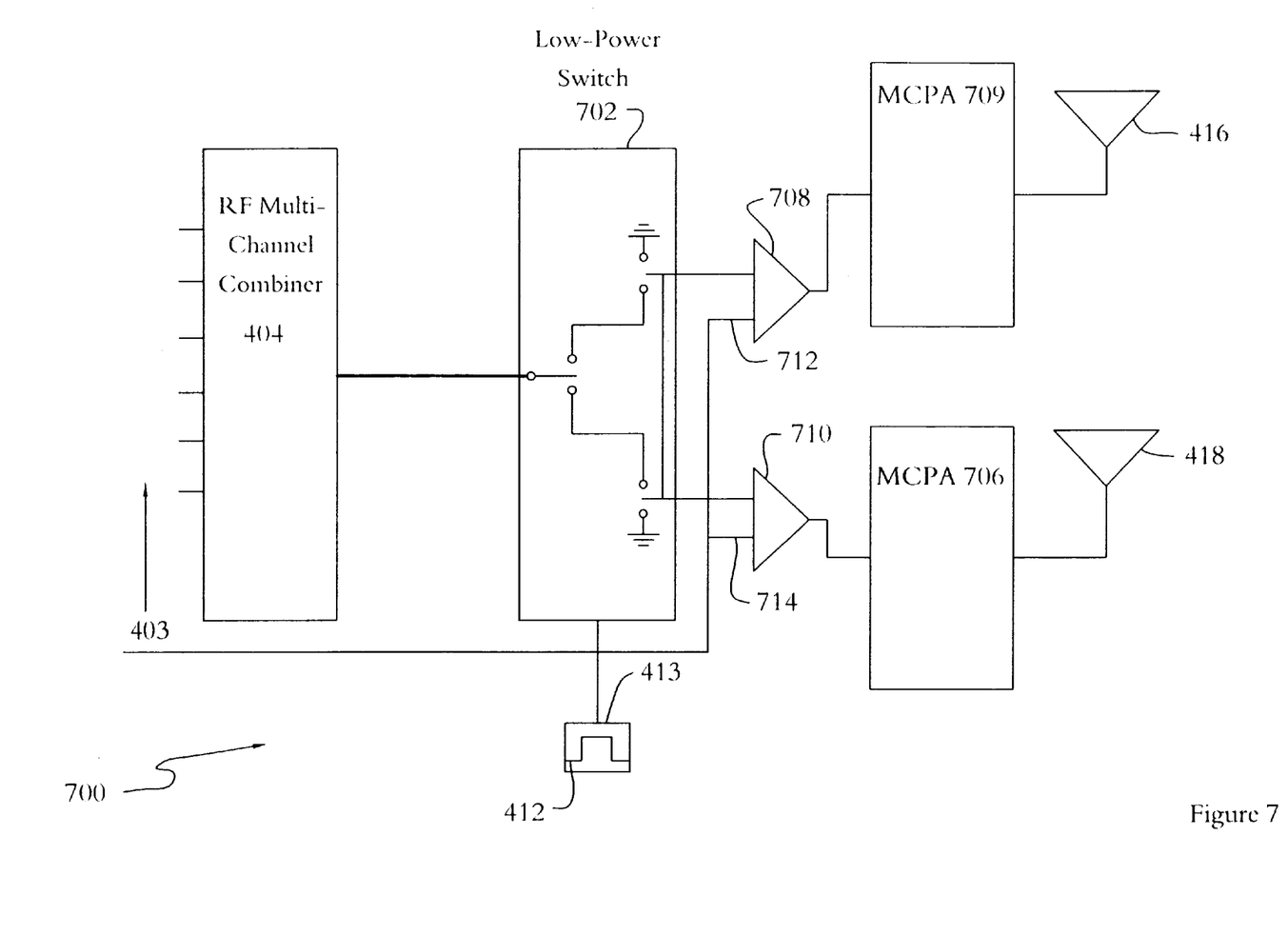
FIG. 7 is a schematic diagram illustrating a system for reducing the effects of fading according to a preferred embodiment of the present invention using multiple MCPAs.

In an alternative embodiment of the present invention, two multi-channel power amplifiers are used and the low power output of the RF multi-channel combiner 404 is switched between them. Referring to FIG. 7, system 700 uses a low-power switch 702 to feed the low power RF signal output by RF multi-channel combiner 404 to either MCPA 704 or MCPA 706 depending on which antenna is determined to be optimal for transmitting the signal. Low-power switch 702 preferably controlled by a TTL synchronization pulse 412 generated by a multivibrator 413 as described above. Control of multivibrator 412 can be by the mobile telephone or the base station as described above.

Two-way combiners 708 and 710 are utilized in the preferred embodiment to prevent MCPAs 704 and 706 respectively from becoming inactive when they are not in use. As described above the signal corresponding to the control signal is provided as one input to two-way combiners 708 and 710 as inputs 712 and 714 respectively. The other input is the output of low-power switch 702, whether the combined RF signal or a connection to ground.

In an alternative embodiment, switching of the antennas according to any of the embodiments described above is performed multiple times per slot, rather than just once. The multiple switching can be performed either automatically or on the basis of estimated signal qualities as described above. It would be apparent to those skilled in the art that other switching times might be chosen to attempt to decorrelate the fading channel.

Switching is preferably performed fast enough to avoid appreciably interrupting the transmission stream. In the preferred embodiment, the time between switches is 20 milliseconds; and the switch occurs in 10 nanoseconds.

Diplexors (not shown) can be employed in the preferred embodiment of the present invention to aid in directing signals received from the antennas and signals to be transmitted by the antennas. Two signals—one at the transmission frequency and one at the received frequency—are input to the diplexors. The diplexors direct the signal on the transmission frequency to the transmitter (antenna) and direct the frequency of the received signal from the receiver (antenna) to the base station. The diplexors are placed in the signal path between the antennas and high-power switch 410.

In an alternative embodiment of the present invention, an isolator (not shown) is added between multi-channel combiner 404 and the low-power switch 406. The isolator assures that low-power switch 406 reflects no energy back into multi-channel combiner 404. An isolator is used when low-power switch 406 is not terminated to ground. As shown in FIG. 4, low-power switch 406 is preferably terminated to ground, to prevent undesired feedback. Thus, an isolator is not required in the preferred embodiment of the present invention.

In the preferred embodiment, high-power switch 410 is connected to a heat sink (not shown) via 50 ohm terminations. The 50 ohm terminations must be sufficient to support the output power of MCPA 408.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for mitigating fading effects in a communication channel between a mobile telephone and a base station, comprising:
   (a) an RF combiner which receives multiple radio signals to be transmitted to one or more mobile telephones and combines said multiple radio signals into a signal RF output;
   (b) a low-power switch coupled to said RF combiner which switches to connect its output to said single RF output or ground;
   (c) an amplifier coupled to said low-power switch;
   (d) a high-power switch coupled to said amplifier which switches between at least two antennas; and
   (e) a synchronization signal to controllably cause switching of said low-power switch and said high-power switch to cause switching of said antennas without arcing.

2. The system recited in claim 1, further comprising a two-way combiner coupled to said RF combiner and said low-power switch.

3. A system for mitigating fading effects in a communication channel between a mobile telephone and a base station, comprising:
   (a) an RF combiner which receives multiple radio signals to be transmitted to one or more mobile telephones and combines said multiple radio signals into a signal RF output;
   (b) a low-power switch coupled to said RF combiner which switches to connect its output to said single RF output or ground;
   (c) an amplifier coupled to said low-power switch;
   (d) a high-power switch coupled to said amplifier which switches between at least two antennas;
   (e) a synchronization signal to controllably cause switching of said low-power switch and said high-power switch to cause switching of said antennas without arcing; and
   (f) a two-way combiner coupled to said RF combiner and said low-power switch,
   wherein a continuous low-power signal is a first input to said two-way combiner and said RF output is a second input to said two-way combiner.

4. A system for mitigating fading effects in a communication channel between a mobile telephone and a base station, comprising:
   (a) an RF combiner which receives multiple radio signals to be transmitted to one or more mobile telephones and combines said multiple radio signals into a signal RF output;
   (b) a low-power switch coupled to said RF combiner which switches to connect its output to said single RF output or ground;
   (c) an amplifier coupled to said low-power switch;
   (d) a high-power switch coupled to said amplifier which switches between at least two antennas;
   (e) a synchronization signal to controllably cause switching of said low-power switch and said high-power switch to cause switching of said antennas without arcing; and
   (f) a multivibrator to generate said synchronization signal,
   wherein said synchronization signal controls switching of said low-power switch and a delayed version of said synchronization signal controls switching of said high-power switch.

5. The system recited in claim 1, comprising more than two antennas.

6. The system recited in claim 5, further comprising an antenna identification code sent by the mobile telephone to a decoder which causes said high-power switch to connect its input to an antenna identified by said antenna identification.

7. A system for antenna hopping to reduce the effect of fading on communication by mobile telephone comprising:
   a base station;
   a mobile telephone;
   two or more antennas for establishing communication between the mobile telephone and the base station; and
   means for switching between said two or more antennas without arcing,
   wherein said means for switching, comprises:
      a low-power switch;
      a high-power switch which, when switched, causes a switch between said antennas; and
      a synchronization signal for causing said low-power switch to switch at a first time and said high-power switch to switch at a second later time to prevent arcing.

8. A system for antenna hopping to reduce the effect of fading on communication by mobile telephone, comprising:
   a base station;
   a mobile telephone;
   two or more antennas for establishing communication between the mobile telephone and the base station; and
   means for switching between said two or more antennas without arcing,
   wherein said means for switching, comprises:
      a first amplifier coupled to a first antenna;
      a second amplifier coupled to a second antenna; and
      a low-power switch, which couples a combined RF signal to one of said first antenna and said second antenna without arcing.

9. A system for antenna hopping to reduce the effect of fading on communication by mobile telephone, comprising:
   a base station;
   a mobile telephone;
   two or more antennas for establishing communication between the mobile telephone and the base station; and
   means for switching between said two or more antennas without arcing,
   wherein said means for switching comprises:
      a first amplifier coupled to a first antenna;
      a second amplifier coupled to a second antenna;
      a low-power switch, which couples a combined RF signal to one of said first antenna and said second antenna without arcing;
      a first two-way combiner coupled to said low-power switch and said first amplifier; and
      a second two-way combiner coupled to said low-power switch and said second amplifier;
      wherein a control channel is input as a first input to said first and second two-way combiners, and an output of said low-power switch is input as a second input to said first and second two-way combiners.

10. A system for reducing the effect of fading on communication by mobile telephone, comprising an amplifier for amplifying a low-power combined RF signal output by an RF combiner and a low-power switch, which connects its output to the combined RF signal or to ground in response to a synchronization signal, through a high-power switch, which the high-power switch switches to connect the amplified output to one of a first antenna and a second antenna in response to the synchronization signal without arcing.

11. A system for reducing the effect of fading on communication by mobile telephone, comprising:

an amplifier for amplifying a low-power combined RF signal output by an RF combiner through a high-power switch, which the high-power switch switches to connect the amplified output to one of a first antenna and a second antenna in response to a synchronization signal without arcing; and a low-power switch which connects its output to the combined RF signal or to ground in response to said synchronization signal, wherein said low-power switch connects its output to ground when said high-power switch switches said antennas, and reconnects its output to said combined RF signal after said high-power switch switches.

12. The system recited in claim 10, wherein a low-power signal is continuously provided to said amplifier to prevent said amplifier from cutting off.

13. A method for reducing the effect of fading on a communication using a mobile telephone, comprising the steps of:

amplifying a low-power combined RF signal output by an RF combiner-and a low-power switch, wherein the low-Dower switch connects its output to the combined RF signal or to ground in response to a synchronization signal; and connecting said amplified combined RF signal to one of a first antenna and a second antenna through a high-power switch in response to the synchronization signal without arcing.

14. The method recited in claim 13 further comprising the step of providing a continuous signal to said amplifier to prevent said amplifier from cutting off.

15. The method recited in claim 13, further comprising the steps of:

measuring a signal quality of a downlink signal from the mobile telephone to a base station; and generating said synchronization signal in accordance with said signal quality.

\* \* \* \* \*